C. E. THURSTON & J. H. WILKINSON.
Improvement in Fruit Corers and Slicers.

No. 126,426.  Patented May 7, 1872.

126,426

UNITED STATES PATENT OFFICE.

CHARLES E. THURSTON AND JAMES H. WILKINSON, OF SOUTH NEWMARKET, NEW HAMPSHIRE.

IMPROVEMENT IN FRUIT CORERS AND SLICERS.

Specification forming part of Letters Patent No. 126,426, dated May 7, 1872.

*To all to whom these presents shall come:*

Be it known that we, CHARLES E. THURSTON and JAMES H. WILKINSON, of South Newmarket, in the county of Rockingham and State of New Hampshire, have made an invention of a new and useful Combination Implement for "Coring and Slicing" Fruit, &c.; and do hereby declare the following to be a full, clear, and exact description thereof, due reference being had to the accompanying drawing making part of this specification, and in which—

Figure 1:
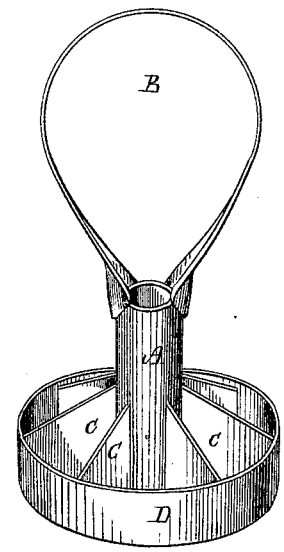
Figure 2:
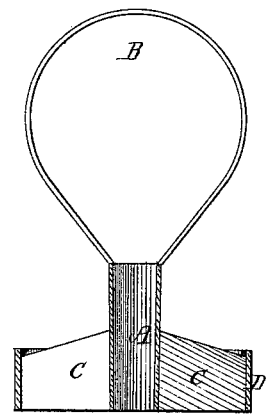

Figure 1 is a perspective representation, and Fig. 2 a vertical section of our improvement.

This invention consists of an implement for slicing and coring fruit, &c., composed of a series of radial blades encircled by a metallic ring or band, affording them external support throughout their width, and affixed to the exterior of a thin metallic open tube, which is provided at its upper end with a yoke-shaped open handle, allowing the core or portion cut out by the tube to escape from the open upper end of the same without coming in contact with the hand.

The drawing accompanying this specification represents at A a thin tube, composed of tin or other suitable material, and slightly tapering throughout its length in order that any substance entering its smaller end may be readily expelled from its larger end. To the upper or larger end of the tube A we affix a yoke-shaped or curved or open handle, B, by which the lower portion of the tube may be forced through the center of an apple or analogous article and remove the center or core of the same, each succeeding core thus cut expelling from the tube the one previously cut.

The handle or the opening of the same is sufficiently large to permit of the expulsion of the contents of the tube without contact of the latter with the operator's hands, and such handle enables pressure to be applied to the tube and its contents, to escape of their own accord.

C C C &c., in the drawing, represents a series of thin plates or blades of uniform size, attached to the lower end of the tube A, and radiating therefrom preferably at regular distances asunder, the outer ends of these blades being connected by a thin annular band or blade, D, which surrounds them.

As the tube A is passed downward through an apple in the act of removing the core the apple is at the same time "sliced" or divided instantaneously, by the blades C C, &c., into uniform-sized pieces.

Under most circumstances the circular blade or band D will not come in contact with the article to be cut; but, as it may occasionally do so, it should possess a thin cutting-edge.

The ring D supports the blades at a point where they most need support, and it extends from the bottom to the top of said blades, thus preventing them from becoming bent or twisted laterally.

The whole device, constructed as above described, is cheap, serviceable, and not liable to get out of order.

The implement above described may be employed to good advantage in slicing fruit or vegetables which do not contain a core, and it may be produced in an ornamental form if desired.

*Claim.*

We claim—

An implement for coring and slicing fruit, &c., composed of the tube A, handle B, radial blades C, and encircling ring D, constructed and arranged as herein shown and described.

CHARLES E. THURSTON.
JAMES H. WILKINSON.

Witnesses:
GEORGE W. WENTWORTH,
SAMUEL T. PAUL.